Feb. 25, 1930.  W. R. HUME  1,748,178
ROTARY RETORT
Filed Sept. 25, 1924    2 Sheets-Sheet 1

Inventor:
Walter Reginald Hume
By
Attorney.

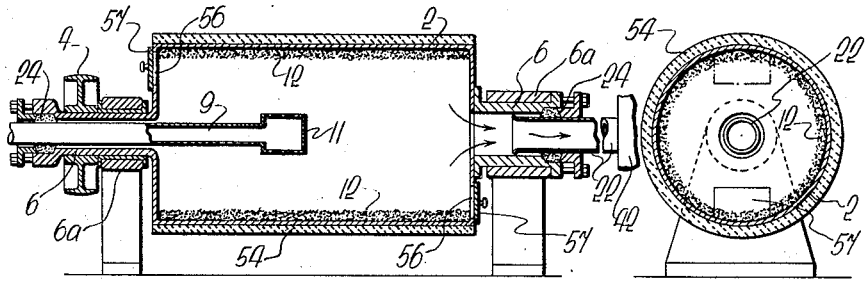
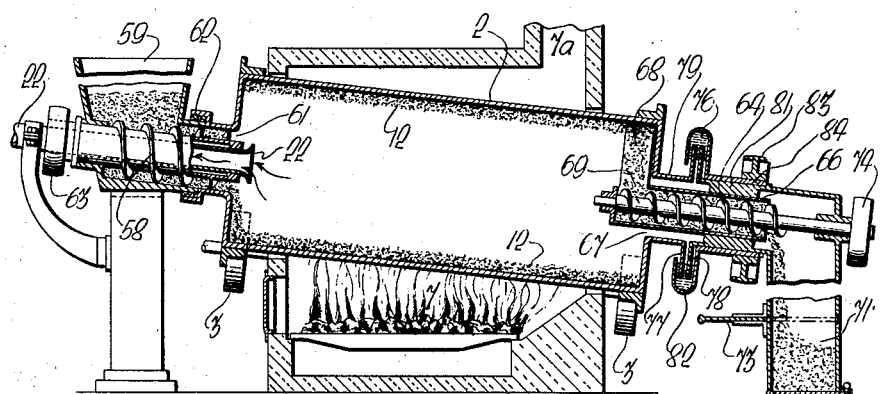

Patented Feb. 25, 1930

1,748,178

UNITED STATES PATENT OFFICE

WALTER REGINALD HUME, OF MELBOURNE, VICTORIA, AUSTRALIA

ROTARY RETORT

Application filed September 25, 1924, Serial No. 739,918, and in Australia October 12, 1923.

This invention relates to the heat treatment of materials for the extraction of volatile constituents or moisture therefrom. As examples of the practical application of the invention may be mentioned the distillation of oils from their basic elements; volatile hydrocarbons and relatively light and heavy oils, creosote tar and wax from coal; the production of plaster and cement from powdered gypsum or gpysite; the calcination of ores and the like; the dehydration of carbonaceous, vegetable and other products for the extraction of moisture therefrom; and many similar applications where is is necessary to subject the materials to heat treatment and it is desirable that the material should be spread out over as large an area as possible during such treatment.

For purposes such as indicated it has hitherto been customary to place the material in a stationary heating chamber or container or to rake the material over the hearth of a calcining furnace through which hot air is allowed to pass or in some cases to feed the material, such for instance, as cement into a slowly rotating heated cylinder or kiln by which the material is carried upwardly and then dropped to the bottom of the cylinder, as the latter rotates.

The primary object of the present invention is to provide an improved process and apparatus for the heat treatment of solid and other materials whereby the material under treatment is simultaneously subjected to centrifugal action and heat within a centrifugal vessel or container which is rotated at a sufficiently high speed to throw the material outwardly against the wall of the container where it is spread out and sustained in a relatively thin and uniform layer or body so that a relatively large proportion of the material is actually exposed to the available heating surface or area with the result that maximum heating efficiency and more rapid and effective treatment than hitherto is obtained.

A further important step in the improved process is the interruption of the centrifugal action to dislodge the material from the wall of the container during the course of the process, the centrifugal action being then resumed so that the particles of material are thus separated or disassociated and regrouped and all parts of the mass are thereby effectively treated.

The invention also provides for the withdrawal and recovery of volatile or gaseous products from the interior of the centrifugal container during the centrifugal operation and also for the removal of the residual or resultant matter either during or subsequent to the centrifugal operation.

In the distillation or carbonization of materials such as pulverized coal the invention also provides for the combustion of the gases derived therefrom as they emerge from the centrifugal container, the residual matter, such as coke which accumulates within said container being discharged into a furnace or combustion chamber where it is consumed in conjunction with the gases given off by the distillation treatment.

Further objects and features of the invention will be hereinafter evident by reference to the accompanying drawings which illustrate, semi-diagrammatically, various examples of the practical application of the invention.

But in order that this invention may be better understood reference will now to be made to the accompanying sheet of drawings which are to be taken as part of this specification and read herewith.

Figure 6 is a longitudinal section of another apparatus operating in accordance with the invention, the centrifugal container being in this example provided with internal steam seating means.

Figure 7 is a cross section of the embodiment seen in Figure 6.

Figure 1:
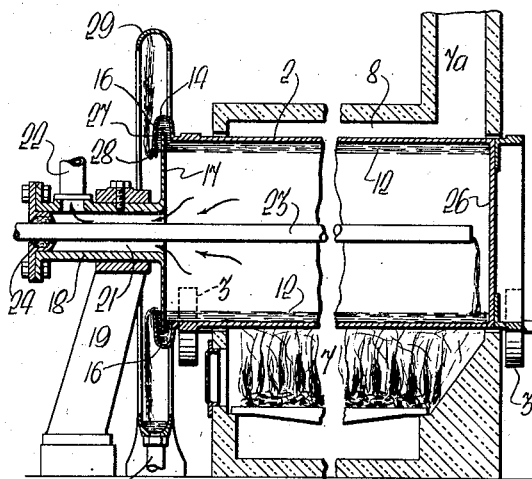
Figure 1 is a broken longitudinal section of one form of apparatus operating in accordance with the invention.

Figure 8 is a broken longitudinal section of another form of apparatus according to which the material to be treated is automatically and continuously fed into the centrifugal container and the residual or resultant matter similarly discharged therefrom during the centrifugal action. The container is inclined downwardly from its inlet or feeding end to its discharge end to facilitate the progress of the material therethrough.

Figure 9 shows in section an arrangement somewhat similar to that seen in Figure 8 but wherein the rotary container is of tapered or conical shape and adapted to revolve about a horizontal axis.

Figure 10 is a transverse section of the centrifugal container as seen in Figures 8 and 9 and showing a scraper device whereby the residual matter may be dislodged from the wall of the centrifugal container and discharged therefrom.

Figure 11 shows an apparatus operating in accordance with the invention and adapted for the distillation and combustion of carbonaceous fuel the arrangement being such that the volatile products extracted from the fuel in the centrifugal container pass therefrom into a combustion chamber or furnace where they are ignited whilst the residual matter may be discharged as desired from said container into said furnace to effect complete combustion of the material.

Figure 12 is a part sectional view looking from the left hand end of Figure 11.

Like reference numerals are employed to designate like or equivalent parts in the various figures. The unbroken arrows indicate the course of the volatile products separated or extracted from the materials under treatment whilst the broken arrows denote the course of the gases by which the centrifugal container is heated.

Figure 2:
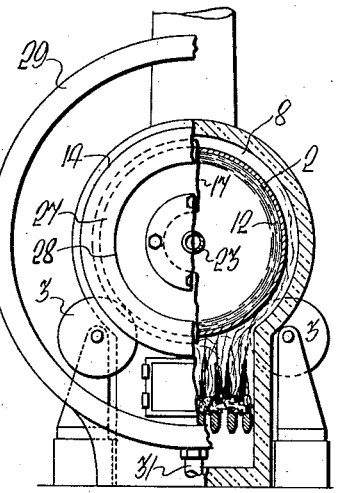
Figure 2 is a part sectional elevation looking from the left hand end of Figure 1.
Figure 3:
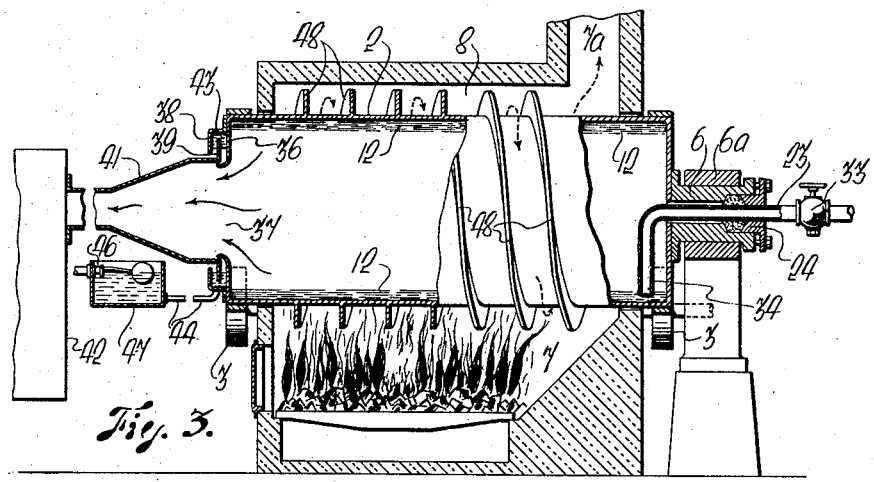
Figure 3 is a part sectional longitudinal elevation of a modified apparatus in accordance with the invention.
Figures 4, 5:
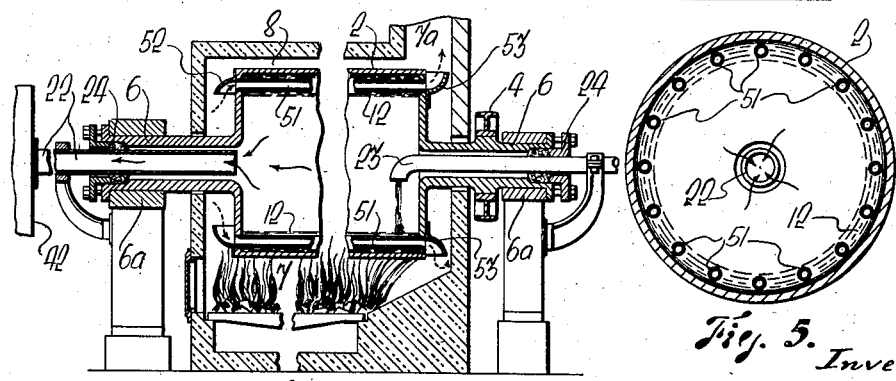
Figure 4 is a broken longitudinal section of a further modified apparatus according to the invention, the centrifugal container being in this instance fitted with internal heat conducting tubes which are adapted to pass through the material under treatment.
Figure 5 is a cross section on an enlarged scale of the centrifugal container provided with internal heat conducting tubes as seen in Figure 4.

In the drawings the numeral 2 indicates the centrifugal container which may be of cylindrical or other suitable form and may be rotated by any suitable driving means such for instance as frictional supporting rollers 3 as seen in Figures 1, 2, 3, 8 and 11, or a pulley or like driving member 4 mounted on a hollow axle or trunnion 6 projecting from the end of the container 2 as indicated in Figures 4, 6 and 9.

The centrifugal container 2 may be heated either externally or internally, for instance by a furnace 7 which may communicate with a substantially annular heating chamber 8 which surrounds or partially surrounds the centrifugal container. Alternatively this centrifugal container may be heated internally as, for example, by steam entering through a steam pipe 9 (Figure 6) which may pass through the hollow axle 6 to a distributor 11 by which the heating fluid is directed towards the peripheral wall of the container where the material, indicated throughout the figures by the numeral 12, is arranged and sustained by the centrifugal action of the container.

It will be evident that the material within the container 2 may, alternatively, be heated by electrical or other means, for instance in some cases an electric arc may be formed within the container by suitably arranged electrodes.

Referring more particularly to Figures 1 and 2 it will be seen that the centrifugal container 2 is provided at one end with an annular lip or flange 14 which is turned outwardly and inwardly to form a subtsantially U shaped annular channel or sealing space indicated at 16. This channel freely accommodates the peripheral portion of a stationary end plate 17 which extends across and partially closes the adjacent end of the centrifugal container. The end plate 17 is carried by a hollow central sleeve 18 secured to a suitable support 19 and forming a central outlet passage 21 which communicates with an outlet pipe 22 for the withdrawal of the volatile or gaseous elements from the centrifugal container. The material to be treated, such for instance, as heavy or crude oil to be distilled or refined, may be introduced into the centrifugal container 2 through an inlet or feed pipe 23 which may pass through a gland or like jointing device 24 closing the outer end of the passage 21, the opposite end of the container 2 being closed by an end plate as at 26.

In operating the apparatus seen in Figure 1 the material such for instance as a liquid to be distilled is thrown outwardly against the wall of the centrifugal container 2 by centrifugal action so that it is spread uniformly and in a relatively thin layer or body around and against the heated wall of the container. The volatile or gaseous elements may pass away through the passage 21 and pipe 22 to a condenser or other recovery device whilst the heavier or residual portions of the liquid are caused to pass out through the annular channel or sealing space 16 into which the liquid under treatment is forced by the centrifugal action thereby forming a liquid seal which permits the residual matter to escape without admitting air into the container. It will be evident that the thickness or quantity of the annular body of material retained against the wall of the container during the centrifugal action, will be governed by the width or depth of the inwardly projecting lip 27 which extends around the sealing space 16, the escaping residue passing over the edge 28 of this lip and being thrown outwardly by the centrifugal force as indicated in Figure 1. To collect this residue or resultant product as it is thus thrown outwardly from the seal 16 an annular trough 29 may be arranged around the seal as shown. The material thus collected by the trough will naturally run or drop to the bottom where it may be drawn off through a suitable collecting pipe indicated at 31.

Referring now to Figure 3 it will be seen that the inlet pipe 23 by which the material is introduced to the centrifugal container 2, passes into one end thereof through a hollow axle or trunnion 6 which projects from the end of the container and rotates therewith in a bearing indicated at 6ª, the desired joint being formed by a gland 24 or other suitable jointing device. The introduction of the material may be controlled and regulated by a suitable cock or valve 33 and, if desired, the inner end of the inlet pipe 23 may be turned radially outwards towards the wall of the container 2 as indicated at 34. In order to provide for the free escape of the volatile or gaseous elements from the container 2 one end 36 of the latter may be provided with a central outlet opening 37 surrounded by an external lip or flange 38 which is carried by the centrifugal container and surrounds a cooperating outturned lip or flange 39 on a stationary discharge conduit 41 which may lead to a condenser 42 or other receptacle for the recovery of the volatile products. An annular channel or space 43 is thus formed around the outlet 37 so that by introducing water into said channel through a supply pipe 44, the centrifugal action of the container 2 causes an effective water seal to be formed between the rotating and stationary members 38, 39, thereby permitting the free escape of the gaseous products from the container without loss and without admitting air to the apparatus. The water within the seal channel 43 may be maintained at a constant level by means of a float controlled valve 46 within a cistern 47 from which a supply pipe 44 leads to the seal. Spiral ribs 48 may be formed around the outer periphery of the container 2 to increase the heating efficiency of the container and set up an artificial draft towards the flue 7ª of the furnace 7.

In Figure 4 the centrifugal container 2 is shown as provided with two hollow axles or trunnions 6 projecting from the opposite ends of the container and rotating therewith in bearings 6ª, the material inlet pipe 23 passing through one of said hollow axles whilst the outlet pipe 22 for the gaseous or volatile products passes stationarily through the other hollow axle, the desired joints being formed around the inlet and outlet pipes as indicated at 24. In order to increase the heating surface in contact with the material under treatment a circular row or rows of heat conducting tubes 51 may pass through the centrifugal container 2 from end to end thereof and adjacent its peripheral wall so that the material 12 thrown outwardly by centrifugal action as aforesaid, surrounds or comes into contact with the tubes 51 thereby facilitating the heat treatment. The tubes 51 may be provided at one end with inducting cowls or hoods 52 adapted to induce the heat from the furnace 7 into the tubes, the opposite ends of the latter being provided if desired with exhaust cowls or hoods 53 to further increase the inductive effect.

Referring more particularly to Figures 6 and 7 I have shown an internally heated container 2 which may be coated with a covering or lagging of asbestos or other suitable heat insulating material indicated at 54 to retain the heat within the container to which it is supplied by the internal steam pipe 9 as beforementioned. By thus bringing steam into direct contact with the material within the centrifugal container 2 distinct advantages may be gained in the treatment of certain materials. For instance by thus treating carbonaceous material such as pulverized coal, with steam whilst the centrifugal container is also externally heated to the desired degree, water gas may be produced the container being also externally heated if desired during the process and the gaseous products passing out of the container through a suitable outlet such as the outlet pipe 22 in one of the hollow axles 6. In this example of the invention inlet and outlet openings 56 have been shown in the ends of the container 2 these openings being suitably closed by doors or covers 57 whereby the material may be manually fed into the centrifugal container and the residual or resultant matter may be similarly removed therefrom by stopping the rotation of the container.

In Figure 8 means are shown for automatically feeding the material such for instance as pulverized coal, ore or the like into the centrifugal container 2 and for automatically removing the residual matter therefrom during the centrifugal process. Such automatic feeding means may comprise a screw conveyor 58 working within a feed hopper 59 and adapted to carry the material through an inlet opening 61 in one end of the centrifugal container, a suitable joint being formed as at 62 between the rotary container and the stationary hopper. The conveyor 58 may be operated by a pulley 63 or the like and may rotate about the stationary outlet pipe 22 by which the gaseous or volatile products are withdrawn from the container 2. In order to cause the material to gravitate from the feed opening 61 during the centrifugal process the container 2 may be inclined downwarly towards its opposite end where the residual or resultant matter is automatically discharged. This automatic discharge of the treated material may be effected for instance by a screw conveyor 64 operating within a trough or casing 66 extending longitudinally through a discharge opening 67 at the lower end of the centrifugal container.

In order to remove any material adhering to the wall of the centrifugal container a suitable scraper device such as an arm 68 may be arranged within and adjcent the discharge end of the container as indicated in Figures 8, 9 and 10. The material thus removed from the wall of the container may fall through an opening 69 in the conveyor casing 66 through which it is carried by the discharge conveyor 64 and may be discharged to a vertical receiving chamber or collector 71 for removal as desired. The receiver 71 may be provided with a discharge door 72 and, to permit of the removal of the residual material, such for example as coke from the distillation treatment of coal, without admitting air into the apparatus; a second door or closure 73 may be provided, this latter door being closed and the door 72 opened to discharge the material from the chamber 71. The conveyor 64 may be driven by a pulley 74 or the like and a centrifugal water seal device indicated at 76 may be employed to form an air-tight joint between the out-turned flanges 77 and 78 which are respectively carried by an outwardly projecting central sleeve 79 on the adjacent end of the rotary container 2 and an axially coinciding stationary sleeve or casing 81 within which the conveyor 64 is located.

In order to thoroughly subject the whole of the material within the centrifugal container 2 to the heat treatment, the rotation of the container may be stopped or slowed down sufficiently to destroy the centrifugal action and allow the material to fall from the upper part of the container wall to the bottom thereof whereupon the centrifugal operation is resumed with the result that the particles of material are effectively separated and regrouped around the wall of the container. This interruption and resumption of the centrifugal process may be repeated at intervals so that those particles which were originally disposed near the inner side of the layer or body may be brought into more intimate contact with the heated wall of the container so that the whole mass is effectively treated. It will be evident that the inclination of the container as in Figure 8, or the tapering thereof as in Figure 9, hereinafter described, will augment this disassociation and regrouping of the particles owing to the movement of the material through the container.

In order to keep the water seal 76 in action when the rotation of the container 2 is slowed down or stopped as above mentioned, the outer channel shaped annular member 82 of the water seal device may be rotated continuously and independently of the container 2 by any suitable means such for instance as a pulley 83 mounted on a rotary sleeve 84 to which the annular channel member 82 is attached.

In Figure 9 an arrangement similar to that of Figure 8 is illustrated, the container 2 in this case being of tapered or conical formation so that it diverges from one end, where the material is introduced, to the other end where the residue or treated material is taken off. The material is thus caused to move towards the larger or discharge end of the container during treatment. In this example the centrifugal container is shown as rotated by a pulley or the like 4 on one of the hollow axles 6 which is supported in bearings 6$^a$ as before mentioned. Other parts in this figure are indicated by the same numerals as corresponding parts in Figure 8 except that a stuffing box or like jointing device 86 rotating about the conveyor housing 66, is substituted for the water seal shown in Figure 8.

In Figures 11 and 12 an arrangement is shown whereby carbonaceous material such as pulverized coal may be distilled within the centrifugal container 2 by the heat from a furnace into which the gaseous products pass from the container 2 for immediate combustion and into which the residual matter such as the coke may also be discharged from the centrifugal container so that complete combustion of the material is effected within said furnace. In this case the invention is shown applied to a boiler furnace 7 the boiler being indicated in broken lines at 86 and the heating tubes thereof at 87. The inner end of the centrifugal container is provided with discharge openings 88 through which both the gaseous products and the residual matter of the distilled carbonaceous material may be discharged for combustion within the furnace the products of combustion passing through the tubes or flues 87 in the usual manner. By means of a rake, scraper or the like the residual matter such as the coke may be discharged at intervals through the openings 88 onto the fire bars of the furnace 7 for complete combustion. The container 2 may be suitably mounted within the furnace for instance by a trunnion 89 projecting from its inner end and suitably supported as for example in one of the fire tubes 87 of the boiler. The opposite or outer end of the centrifugal container may project from the front wall of the furnace and rest upon frictional driving wheels 3 before referred to. The material may be introduced into the container 2 through a feed opening 91 in its outer end, this opening being closed when the container is in operation by means of a door 92 which is free to rotate about a pin 93 on an arm 94 which may be pivoted at 96 and provided with a counter-weight 97 adapted to swing the door upwardly when the opposite end of the arm 94 is released from a suitable catch 98 as shown in Figure 12. The fuel may thus be introduced manually or otherwise through the opening 91. When the door 92 is closed it is permitted to rotate with the container 2 about the axis 93. A scraper 101 in the form of a disc of slightly less diameter than the interior of the container 2 may be used to force the residual matter adhering to the wall of the container out through the openings 88 prior to the introduction of a new charge, the rotation of the container being stopped if necessary during the cleaning out and charging operations. By this application of the invention the fuel may be readily and effectively carbonized and burned to obtain the full calorific value of the material.

It will be evident with regard to the general application of the invention, that if desired the material may be treated under vacuum by exhausting the air from the centrifugal container 2 for instance through the outlet pipe 22 in Figure 6 the container being of suitable air tight construction for the purpose. In all cases the effective spreading or distribution of the material over a relatively large area by the centrifugal action set up in the container causes the material to present a maximum exposed surface to the action of the heat and thus greatly facilitates the treatment.

Furthermore the heat treatment may be regulated to a nicety by varying the quantity of material introduced into the centrifugal container and consequently the thickness of the body or layer spread against its wall according to particular requirements and the degree of heat employed.

It will be evident that a plurality of the centrifugal containers may be employed to operate in conjunction the residue or treated material from one centrifugal container being delivered into another such container for further treatment, for instance at a higher temperature.

In some cases it may be practicable to subject the material to centrifugal action by the employment of rotating vanes or the like operating within a stationary container so that the material is spread out around the wall of the latter during the heat treatment It is therefore intended and desired that the term container or centrifugal container as used in the appended claims, shall, where the meaning permits, be interpreted to include such an equivalent arrangement.

Having now described my invention what I claim as new and desire to secure by Letters Patent is:—

1. Apparatus for the heat treatment of material comprising a container having two ends and adapted for subjecting the material to centrifugal action and thereby spread out and sustain itself against the wall thereof, a flange at one end of the container comprising an outwardly and inwardly bent member forming a U-shaped annular channel, and an end plate adapted to project into the annular channel of the flange to form a seal construction at the same time allowing discharge of the material therethrough.

2. Apparatus for the heat treatment of material comprising a container having two ends and adapted for subjecting the material to centrifugal action and thereby spread out and sustain itself against the wall thereof, means for feeding the material into one end of said container, a flange at the other end of the container comprising an outwardly and inwardly bent member forming a U-shaped annular channel, and an end plate adapted to project into the annular channel of the flange to form a seal construction at the same time allowing discharge of the material therethrough.

3. Apparatus for the heat treatment of material comprising a container having two ends and adapted for subjecting the material to centrifugal action and thereby spread out and sustain itself against the wall thereof, means for feeding the material into one end of said container, a flange at the other end of the container comprising an outwardly and inwardly bent member forming a U-shaped annular channel, an end plate adapted to project into the annular channel of the flange to form a seal construction at the same time allowing discharge of the material therethrough, and an annular trough surrounding the seal to collect the material discharged through the seal.

4. Apparatus for the heat treatment of material comprising a container having two ends and adapted for subjecting the material to centrifugal action and thereby spread out and sustain itself against the wall thereof, means for feeding the material into one end of said container, a flange at the other end of the container comprising an outwardly and inwardly bent member forming a U-shaped annular channel, an end plate adapted to project into the annular channel of the flange to form a seal construction at the same time allowing discharge of the material therethrough, and a furnace construction for heating the container.

5. Apparatus for the heat treatment of material comprising a container having two ends and adapted for subjecting the material to centrifugal action and thereby spread out and sustain itself against the wall thereof, means for feeding the material into one end of said container, a flange at the other end of the container comprising an outwardly and inwardly bent member forming a U-shaped annular channel, an end plate adapted to project into the annular channel of the flange to form a seal construction at the same time allowing discharge of the material therethrough, an annular trough surrounding the seal to collect the material discharged through the seal, and a furnace construction for heating the container.

6. Apparatus for the heat treatment of material comprising a container having two ends and adapted for subjecting the material to centrifugal action and thereby spread out and sustain itself against the wall thereof, means for feeding the material into one end of said container, a flange at the other end of the container comprising an outwardly and inwardly bent member forming a U-shaped annular channel, an end plate adapted to project into the annular channel of the flange to form a seal construction at the same time allowing discharge of the material therethrough, and means for withdrawing volatile or gaseous elements from the container.

7. Apparatus for the heat treatment of material comprising a container having two ends and adapted for subjecting the material to centrifugal action and thereby spread out and sustain itself against the wall thereof, means for feeding the material into one end of said container, a flange at the other end of the container comprising an outwardly and inwardly bent member forming a U-shaped annular channel, an end plate adapted to project into the annular channel of the flange to form a seal construction at the same time allowing discharge of the material therethrough, and a central outlet passage axially arranged with respect to the container for withdrawing volatile or gaseous elements from the container.

8. Apparatus for the heat treatment of material comprising a container having two ends and adapted for subjecting the material to centrifugal action and thereby spread out and sustain itself against the wall thereof, means for feeding the material into one end of said container, a flange at the other end of the container comprising an outwardly and inwardly bent member forming a U-shaped annular channel, an end plate adapted to project into the annular channel of the flange to form a seal construction at the same time allowing discharge of the material therethrough, a furnace construction for heating the container, and a central outlet passage axially arranged with respect to the container for withdrawing volatile or gaseous elements from the container.

9. Apparatus for the heat treatment of material comprising a furnace, a container rotatably mounted in said furnace and having two ends, said container being adapted to receive the material to be subjected to centrifugal action and thereby spread out and sustained against the wall thereof, a pipe for feeding the material at one end into the container, a flange at the other end of the container consisting of an outwardly and inwardly bent member forming a U-shaped annular channel, an end plate adapted to project into but spaced from the annular channel of the flange to form a seal construction at the same time allowing discharge of the material therethrough, an annular trough surrounding the seal to collect the material discharged through the seal, and a central outlet passage for withdrawing volatile or gaseous elements from the container.

In witness whereof I hereunto affix my signature.

WALTER R. HUME.